United States Patent [19]

Kinnear

[11] Patent Number: 4,594,765

[45] Date of Patent: Jun. 17, 1986

[54] STRAND COVERING DEVICES AND METHODS

[76] Inventor: Joseph W. Kinnear, 2765 First Pl., Vero Beach, Fla. 32960

[21] Appl. No.: 672,137

[22] Filed: Nov. 16, 1984

[51] Int. Cl.$^4$ .................... B23P 11/02; B23P 19/02
[52] U.S. Cl. .................................... 29/450; 29/453; 29/235
[58] Field of Search ............... 29/450, 453, 235, 234; 114/113, 102, 103, 108, 93

[56] References Cited

U.S. PATENT DOCUMENTS

| | | | |
|---|---|---|---|
| 2,613,915 | 10/1952 | Stone | 29/450 UX |
| 2,731,040 | 1/1956 | Warburton | 29/450 UX |
| 3,173,199 | 3/1965 | De Redder | 29/235 |
| 3,175,282 | 3/1965 | Meeker et al. | 29/453 X |
| 3,523,356 | 8/1970 | Graf | 29/453 |
| 3,606,670 | 9/1971 | Wienand et al. | 29/235 X |
| 3,650,011 | 3/1972 | Ausnit | 29/450 X |
| 4,100,717 | 7/1978 | Kontinen | 29/235 X |
| 4,432,124 | 2/1984 | Breuers | 29/235 |

FOREIGN PATENT DOCUMENTS 2152479 12/1972 Fed. Rep. of Germany ........ 29/235
1020026 2/1966 United Kingdom ................ 29/235

*Primary Examiner*—Charlie T. Moon
*Attorney, Agent, or Firm*—Carroll F. Palmer

[57] ABSTRACT

Hand tools described for use in covering a longitudinal portion of a strand with a slit, flexible, protective tube comprise a pair of planar members, each having a face surface with a longitudinal guide groove therein, that may be held face-to-face to define a tubular guide path for the strand, plus other related elements.

In use of such a tool, a strand to be covered is moved longitudinally relative to said guide path, a covering tube is guided at an angle into the guide path and as the tube intersects with such path, a portion of its longitudinal slit is opened just prior to the intersection. This results in the strand entering the opened slit portion which then closes over the strand and the resulted covered strand moves away from the point of intersection. In preferred embodiments, an angled portion of a small diameter rod fixed within the tool is used to open the tube slit for entrance of the strand and rollers are used to steer the covering tube from its angled path into the guided path of the strand.

16 Claims, 13 Drawing Figures

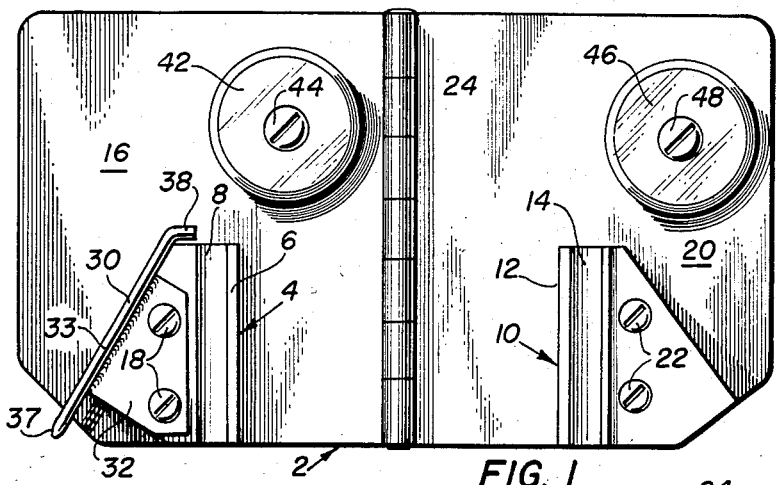
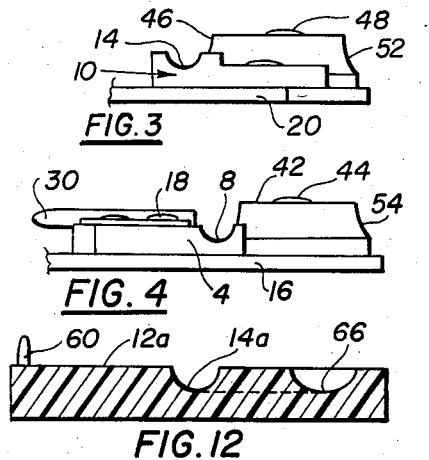
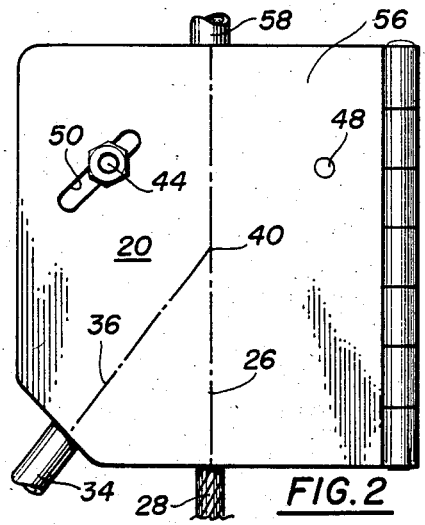
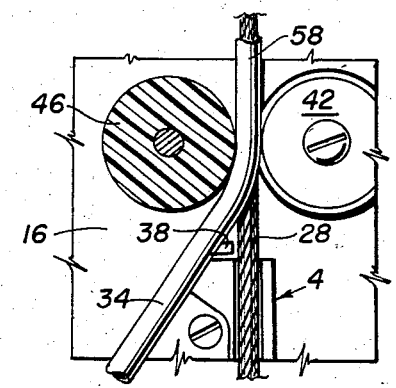
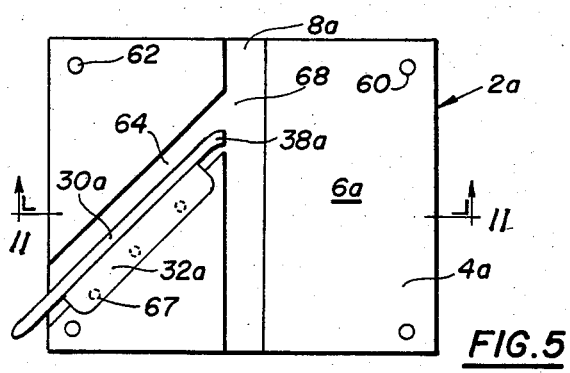
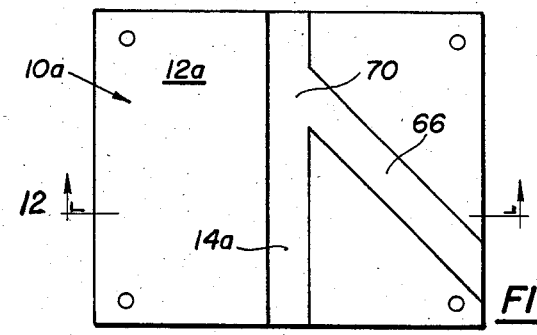
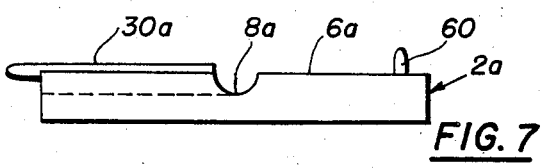
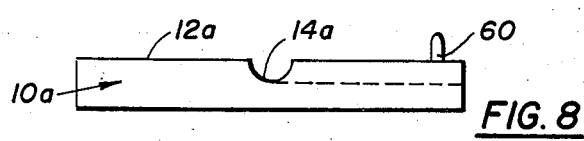
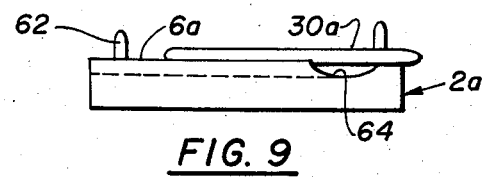
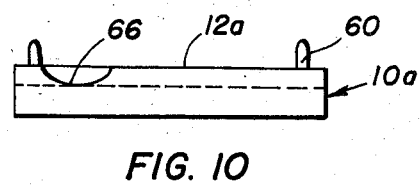

STRAND COVERING DEVICES AND METHODS

BACKGROUND OF THE INVENTION

1. Field of the Invention

This invention relates broadly to devices and methods for covering cables, rods, wires, cords or like strands with flexible tubing. More particularly, it concerns hand tools that permit protective coverings to be easily positioned over cables or other strands by application of longitudinally slit, flexible tubing around the strands.

2. Description of the Prior Art

There are numerous situations in which it is desirable to apply a tubular covering around a cable or other strand to protect the strand and/or to prevent the strand from injuring objects that may come into contact therewith. By way of example, it is common practice to cover the cable shrouds of sailboat riggings with slit, plastic covers to mitigate damage to sails that come into contact with the shrouds in use of the sailboat. Also, it is conventional to protect mooring, anchoring and towing lines against chafing by tubular coverings in the portions that will be subject to chafing action.

A common method of providing protective coverings to strands is to apply a slit tube by hand onto the strand by spreading apart the slit in the tube and forcing the strand into the parted slit. Such hand operations are invariably tedious and time consuming. Hence, various devices and schemes have been disclosed for improving upon such manual strand covering operations. For example, U.S. Pat. No. 3,117,371 discloses methods in which protective covering on cords and ropes are provided by spiral-like wrappings of plastic or rubber strips. A variation of such spiral wrapping for the application of insulation on tubes, pipes and other conduits is disclosed in U.S. Pat. No. 4,218,814.

In contrast to spiral such wrapping techniques, the present invention concerns operations in which covering tubes that have an essentially straight, longitudinal slit therein are applied to cables, cords, ropes, wires, rods and like filamentous items that are collectively referred to herein as strands.

It is also well known to apply protective sheaths, tubular coverings, etc. to strands in production operations, often operated in continuous manner, using wrapping, winding and other forms of apparatus usually of relatively complex construction, e.g., see U.S. Pat. No. 4,170,817. The present invention is contrasted to such methods and apparatus by being concerned with relatively simple hand tools that are used in piece-work fashion to apply tubular coverings to individual portions of strands, often fixed in position on location, e.g., the cable shrouds of a sailboat.

In spite of the numerous disclosures of various types of strand coating methods and devices as briefly mentioned above, there exists a need for improvements in hand tools for applying tubular coverings to strands and in methods of conducting such applications.

OBJECTS

A principal object of this invention is the provision of new devices and methods for covering cables, rods, wires, cords or like strands with flexible tubing.

Further objects include the provision of:

1. New hand tools for use in piece-work fashion to apply tubular coverings to individual portions of strands, often fixed in position on location, e.g., the cable shrouds of a sailboat.

2. New methods for applying in piece-work fashion tubular coverings to individual portions of strands, even in a fixed position at some location or on some structure 3. New tools and methods for hand application of slit tubular coverings to strands that may have the end thereof fixed in position and blocked by the elements to which the strands are attached.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The stated objects of the invention are, in part, accomplished by the provision of new devices for use in applying longitudinally slit, flexible, covering tubes around longitudinal portions of strands. Such new hand tools comprise a first planar member having a face surface with a first longitudinal guide groove therein and a second planar member having a face surface with a second longitudinal guide groove therein that approximately mimics the first groove.

The new tools also include (a) means to hold the planar members together face-to-face with the stated first and second grooves longitudinally mated defining a substantially straight tubular guide path for passage of a strand portion, (b) means to guide a covering tube along a locus that intersects the longitudinal axis of the guide path at an angle, (c) means to open the slit of the covering tube as it transits the locus adjacent the point of intersection of the locus with the axis and (d) means to turn the covering tube from such locus onto the guide path axis as the tube passes the point of intersection.

By way of example, the strands to be covered by the new hand tools may be a cable, wire, rod, cord or the like. Also, the covering tube is advantageously made of flexible, plastic material and has an inside diameter (I.D.) substantially equal to the outside diameter (O.D.) of the strand being covered.

In preferred embodiments, the means to open the tubing slit is the integral end portion of a rod that also comprises an elongated, straight section that extends along the stated locus of tubing travel and such end portion is angled with respect to locus toward axis of the guide path. Advantageously, such rod is held by a lateral tongue that is supported on the first member of the tool.

In preferred forms of the new tools, the first member and one of a pair of rollers are attached to a first plate, the second member and the other of the pair roller are attached to a second plate and the plates are hinged together to permit the first member to engage the second member face-to-face with the grooves longitudinally mated.

In another form of the tools, there are no guide rollers and the first member is a quadrilateral plate with the first groove extending from one side to the opposite side while the second member is also a quadrilateral plate with the second groove extending from one side to the opposite side, and the means to guide comprises a third longitudinal groove in the face surface of the first member extending at an angle from a transverse side of the first member to intersect the first groove and there is a fourth longitudinal groove in the face surface of the second member extending at an angle from a transverse side thereof to intersect the second groove.

The stated objects are also, in part, accomplished by the provision of methods for applying a longitudinally slit, flexible, covering tube around a longitudinal portion of a strand which comprises providing a first planar member having a face surface with a first longitudinal guide groove therein and a second planar member having a face surface with a second longitudinal guide groove therein that approximately mimics the first groove, placing the planar members together face-to-face with the first and second grooves longitudinally mated and with the strand portion positioned in the tubular guide path defined by the mated grooves. The covering tube is passed along a locus that intersects the longitudinal axis of the guide path at an angle, a portion of the slit of the covering tube is opened as it transits the locus adjacent the point of intersection of the locus with the axis, the covering tube is turned from the locus onto the axis as it passes the point of intersection causing the strand to enter the tube through the opened portion of the tube, the opened portion of the tube is then closed and the resulting tube covered strand portion is withdrawn along the longitudinal axis away from the stated point of intersection.

In preferred methods, the turning of the covering tube to meet the strand is effected by means of a pair of rollers that straddle the longitudinal axis of the path being travelled by the strand and the opening of the slit portion of the covering tube is effectd by imposing a portion of a rod having an O.D. smaller that the O.D. of the tube in the path of the slit as the tube transits the aforesaid locus.

BRIEF DESCRIPTION OF THE DRAWINGS

A more complete understanding of the invention may be obtained by reference to the accompanying drawings in which:

FIG. 1 is a plan view of a device constructed in accordance with the invention with hinged parts of the device laid in a opened position.

FIG. 2 is a plan view similar to FIG. 1, but with the device in a closed position and in the process of being used to perform a method of the invention.

FIG. 3 is a fragmentary, lateral view of a portion of the right side of FIG. 1.

FIG. 4 is a fragmentary, lateral view of a portion of the left side of FIG. 1.

FIG. 5 is a plan view of a first section of a two-part device in accordance with the invention.

FIG. 6 is a plan view of the second section of the two-part device to which FIG. 5 also relates.

FIG. 7 is an end view of the first section shown in FIG. 5.

FIG. 8 is an end view of the second section shown in FIG. 6.

FIG. 9 is a side view of the first section shown in FIG. 5.

FIG. 10 is an end view of the second section shown in FIG. 6.

FIG. 11 is a sectional view taken on the line 11—11 of FIG. 5.

FIG. 12 is a sectional view taken on the line 12—12 of FIG. 6.

FIG. 13 is a fragmentary, plan view, partially in section, corresponding to FIG. 2, showing a device of the invention in use to apply a covering tube to a strand.

DESCRIPTION OF THE PRERERRED EMBODIMENTS

Referring in detail to the drawings wherein like parts are similarly numbered, the hand tool 2 comprises a first planar member 4 having a face surface 6 with a first longitudinal guide groove 8 and a second planar member 10 having a face surface 12 with a second longitudinal guide groove 14 therein that approximately mimics the first groove 8.

The member 4 is fixed to a plate 16 by fasteners 18 and member 10 is fixed to plate 20 by fasteners 22. The plates are held together by the hinge 24 and this combination of plates and hinge serve as means to hold the planar members 4 & 10 together face-to-face (see FIG. 2) with the first and second grooves 8 & 14 longitudinally mated defining a substantially straight tubular guide path (not specifically shown) with a longitudinal axis 26 for passage of the strand portion 28.

On the left side of member 4, an elongated rod 30 is supported by tongue 32 which is attached on the face 6 of member 4 by the fasteners 18. The rod 30 comprises an elongated straight section 33 that extends along the locus 36 plus end portions 37 & 38. The end portion 38 is angled with respect to the locus toward the axis 26.

The rod 30 serves, in part, as means to guide a covering tube 34 along locus 36 that intersects the longitudinal axis 26 at an angle. The end portion 38 of the rod 30 serves as means to open the slit (not shown) of the covering tube 34 as it transits the locus 36 adjacent the point of intersection 40 of the locus 36 with the axis 26.

A first roller 42 is rotatably carried on plate 16 by the bolt 44 and a second roller 46 is similarly carried on plate 20 by the bolt 48. The pair of rollers, when the members are in the closed position shown in FIG. 2, function as means to turn the covering tube 34 from the locus 36 onto the axis 26 as it passes the point of intersection 40 (see FIG. 13).

There is a slot 50 in the plate 20 to permit the position of roller 46 to be adjusted relative to roller 42. As an alternative to this slot arrangement, different size rollers 42 & 46 may be used to make clearance adjustments for handling different size shrouds and coverings in the new devices.

FIG. 3 shows a preferred form of roller 46 with contoured side 52 and FIG. 4 a preferred form of roller 42 with contoured side 54.

The device 2 and other devices of the invention are used with tubes 34 that have a longitudinal slit therein made of flexible, plastic material with an I.D. substantially equal to the O.D. of the strand 28.

The method of use of the device 2 comprises placing the planar members 4 & 10 together face-to-face with the first and second grooves 8 & 14 longitudinally mated and with the strand portion 28 positioned in the tubular guide path defined by the mated grooves 8 & 14. The covering tube 34 is pushed onto the end 37 of rod 30 along locus 36 till it encounters the rod end 38 which serves to open the portion of the slit of the covering tube as it transits the locus 36 adjacent the point of intersection 40. Further movement of the tube 34 brings it in contact with rollers 42 & 46 which turn it from the locus 36 onto the axis 26 as it passes the point of intersection 40 thereby causing the strand 28 to enter the tube 34 through its opened portion. Then, as the tube 34 and strand 28 travel further along axis 40 toward the outlet side 56 of device 2, the opened portion of the tube 34 closes about the strand 28 and the resulting tube covered strand portion 58 moves out of the device 2.

The method a just described concerns the covering of an unattached portion of a strand. As has been indicated, the tool 2 may be used in covering strands that are fixed in position, e.g., the vertical shrouds in the rigging of a sailboat. In such applications, the tool 2 would be moved along the stationary strand, in contrast to the method just described in which the tool 2 remains stationary and the tube 34 and strand 28 a drawn through the tool. In either event, there is relative movement between the tool and the tube/strand combination.

FIGS. 5–12 concern another embodiment of a hand tool 2a of the invention in which a plate 4a has a face surface 6a with a first longitudinal guide groove 8a therein and a second plate 10a having a face surface 12a with a second longitudinal guide groove 14a therein that approximately mimics the first groove 8a. These grooves and any others of the invention, e.g., 8 & 14, typically are semicircular to accommodate circular strands, but other shapes are possible, e.g., triangular, square, hexangular, etc., to comply with possible other strand shapes.

The plates 4a & 10a have pins 60 and holes 62 that serve as means to hold the planar members together face-to-face with the fist and second grooves 8a & 14a longitudinally mated.

The plates 4a & 10a are shown in the drawings as made of plastic material, but they may be made of metal, ceramic, etc. and there is also a choice of materials from which to form any of the other elements of the new hand tools.

Additionally, the plate 4a has a third groove 64 in the face 6a and plate 10a has a similar fourth groove 66 in its face 12a. These grooves 64 & 66 serve as means to guide a covering tube along a locus that intersects at an angle to the longitudinal axis of a guide path formed when the plates are brought into face-to-face contact as controlled by the pins 60 and holes 62.

As in the device 2, the tool 2a has a rod 30a held on a tongue 32a and with a bent end portion 38a to serve as means to open the slit of a covering tube as it is operated upon the tool 2a.

The tongue 32a is provided with pins 67 that are embedded in the plate 4a to fix the tongue 32a rod 30a to the plate 4a.

In contrast to device 2, tool 2a has no rollers, but the intersection (junction) 68 of the groove 8a with groove 64 and the intersection 70 of groove 14a with groove 66 serve as means to turn a covering tube onto the axis of a strand moving in the the tool 2a along the path defined by the grooves 8a & 14a.

The method of use of the tools 2a are essentially like that described for the use of the devices 2. In either case, particularly with tools 2a, lubricants can be applied to the covering tubes and/or strands operated upon by them to assist in the aforesaid relative movement.

It will be apparent that the new tools can be made very light in weight and can be easily handled. They make possible the rapid and efficient application of protective covering tubes to cables, rods, cords and similar strands that require this for whatever purpose.

The embodiments of the invention in which an exclusive property or privilege is claimed are defined as follows:

1. A device for use in applying a longitudinally slit, flexible, covering tube around a longitudinal portion of a strand which comprises:
    a first planar member having a face surface with a first longitudinal guide groove therein,
    a second planar member having a face surface with a second longitudinal guide groove therein that approximately mimics said first groove,
    means to hold said planar members together face-to-face with said first and second grooves longitudinally mated defining a substantially straight tubular guide path for passage of said strand portion,
    means to guide said covering tube along a locus that intersects the longitudinal axis of said guide path at an angle,
    means to open said slit of said covering tube as it transits said locus adjacent the point of intersection of said locus with said axis and
    means to turn said covering tube from said locus onto said axis as it passes said point of intersection.

2. A device for use in applying a longitudinally slit, flexible, covering tube around a longitudinal portion of a strand which comprises:
    a first planar member having a face surface with a first longitudinal guide groove of semi-circular cross-section therein,
    a second planar member having a face surface with a second longitudinal guide groove therein that approximately mimics said first groove,
    means to hold said planar members together face-to-face with said first and second grooves longitudinally mated defining a substantially straight tubular guide path of circular cross-section for passage of said strand portion,
    means to guide said covering tube along a locus that intersects said longitudinal axis of said guide path at an angle,
    means to open said slit of said covering tube as it transits said locus adjacent the point of intersection of said locus with said axis,
    means to turn said covering tube from said locus onto said axis as it passes said point of intersection,
    said means to open comprising said integral end portion of a rod juxtaposed to said guide path between said locus and said axis adjacent said point of intersection and
    said means to turn comprising a pair of rollers straddeling said longitudinal axis.

3. The device of claim 1 wherein said strand is a cable, a wire, a rod or a cord.

4. The device of claim 1 wherein said tube is made of flexible, plastic material and has an I.D. substantially equal to the O.D. of said strand.

5. The device of claim 2 wherein said rod comprises an elongated, straight section that extends along said locus and its said end portion is angled with respect to said locus toward said axis.

6. The device of claim 5 wherein said rod is held by a lateral tongue that is supported on said first member.

7. The device of claim 6 wherein said first member and one of said rollers are attached to a first plate, said second member and said other roller are attached to a second plate and said plates are hinged together to permit said first member to engage said second member face-to-face with said grooves longitudinally mated.

8. The device of claim 1 wherein said first member is a quadrilateral plate with said first groove extending from one side to said opposite side,
   said second member is a quadrilateral plate with said second groove extending from one side to the opposite side, and
   said means to guide comprises
      a third longitudinal groove in said face surface of said first member extending at an angle from a transverse side of said first member to intersect said first groove and
      a fourth longitudinal groove in said face surface of said second member extending at an angle from a transverse side of said second member to intersect said second groove.

9. The device of claim 8 wherein said means to guide further comprises a rod with an elongated, straight section that extends along said locus that is held by a lateral tongue supported on said first member.

10. The device of claim 9 wherein said means to open is and integral end portion of said rod that is angled with respect to said locus toward said axis.

11. The device of claim 10 wherein said means to turn comprises said intersection between said first and third grooves and said intersection between said second and fourth grooves.

12. A method for applying a longitudinally slit, flexible, covering tube around a longitudinal portion of a strand which comprises:
   providing a first planar member having a face surface with a first longitudinal guide groove therein and a second planar member having a face surface with a second longitudinal guide groove therein that approximately mimics said first groove,
   placing said planar members together face-to-face with said first and second grooves longitudinally mated and with said strand portion positioned in said tubular guide path defined by said mated grooves,
   guiding said covering tube along a locus that intersects said longitudinal axis of said guide path at an angle,
   opening a portion of said slit of said covering tube as it transmits said locus adjacent said point of intersection of said locus with said axis,
   turning said covering tube from said locus onto said axis as it passes said point of intersection causing said strand to enter said tube through said opened portion of said tube,
   closing said opened portion of said tube and
   drawing the resulting tube covered strand portion along said longitudinal axis away from said point of intersection.

13. The method of claim 12 wherein said tube turning is effected by means of a pair of rollers that straddle said longitudinal axis.

14. The method of claim 12 wherein said opening of said slit portion is effected by imposing a portion of a rod having an O.D. smaller that said I.D. of said tube in said path of said slit as said tube tube transmits said locus.

15. A device for use in applying a slit, flexible, covering tube around a shroud of a sailboat which comprises:
   means defining a tubular guide path for relative movement therein of a portion of said shroud,
   means to guide said covering tube along a locus that intersects the longitudinal axis of said guide path at an angle,
   means to open said slit of said covering tube as it transits said locus, and
   means to turn said covering tube with its opened slit from said locus onto said longitudinal axis whereby said tube may slip over said shroud in said guide path.

16. A device of claim 15 comprising means for permitting said guide path to be opened longitudinally to enable said device to be placed around said shroud portion.

* * * * *